United States Patent [11] 3,609,332

[72] Inventor Donald R. Schindler
 Burton, Ohio
[21] Appl. No. 784,066
[22] Filed Dec. 16, 1968
[45] Patented Sept. 28, 1971
[73] Assignee General Electric Company

[54] PHOTOFLASH LAMP ARRAY WITH REFLECTOR-LAMP MODULE
 7 Claims, 7 Drawing Figs.
[52] U.S. Cl. ................................................ 240/1.3,
 240/103
[51] Int. Cl. ...................................................... G03b 15/02
[50] Field of Search ............................................ 240/1.3,
 103; 95/11 L; 431/9z, 9s

[56] References Cited
 UNITED STATES PATENTS
3,244,087 4/1966 Anderson et al. .............. 240/1.3 X
3,350,551 10/1967 Whitehead .................. 240/1.3
3,358,131 12/1967 Bennett et al. ................ 240/1.3

Primary Examiner—Samuel S. Matthews
Assistant Examiner—Fred L. Braun
Attorneys—Henry P. Truesdell, James J. Lazna, Frank L. Neuhauser, Oscar B. Waddell and Joseph B. Forman ABSTRACT: A photoflash lamp-reflector module for use in a photoflash array for providing optimum optics in a minimum of space where the light source is comparatively large relative to the reflector surface. The module consists of a reflector with a parabolic-type surface for essentially its entire effective reflecting area and a tubular photoflash lamp positioned in the innermost part of the reflector transversely of the axis thereof with the reflector essentially tangent to the lamp. The reflector has an angle relative to its optical axis in the direction of light projection of approximately 45° at a point on that portion of the reflector which is adjacent the centerline of the lamp and extends forwardly of the lamp axis.

PATENTED SEP 28 1971                  3,609,332
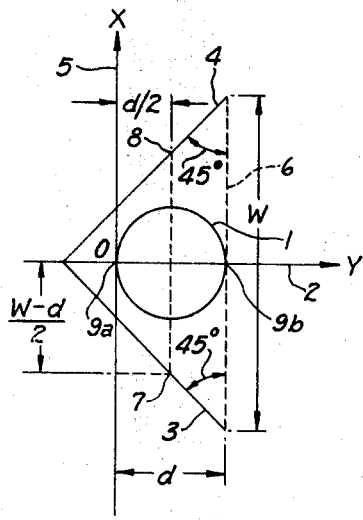
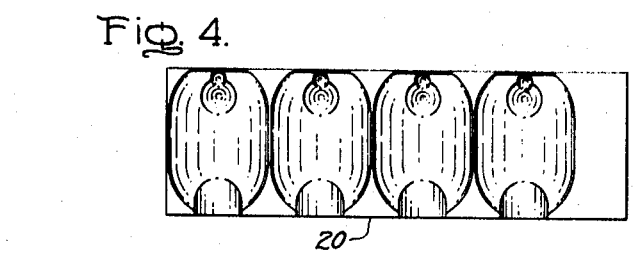
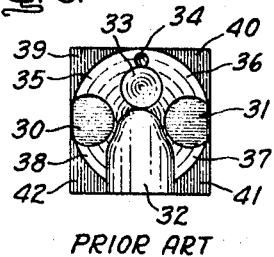
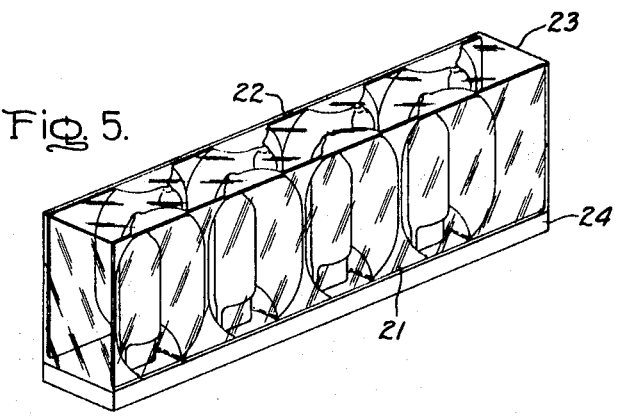
Inventor:
Donald R. Schindler
by Richard H. Burgess
His Attorney

PHOTOFLASH LAMP ARRAY WITH REFLECTOR-LAMP MODULE

BACKGROUND OF THE INVENTION

The present invention relates to photoflash lamp-reflector units or modules. More particularly, it relates to multiple photoflash lamp arrays utilizing such modules.

Much of the prior activity in design of combinations of light sources and reflectors has utilized reflector surfaces which are large relative to the light source for optimum light control. In the multilamp photoflash device known as the flashcube having four lamp-reflector units, each facing in opposite directions in one plane around the faces of a cube, the size of the reflector which could be used was quite small relative to the size of the light source. Much of the internal volume of a flashbulb must be considered as the light source. Reflectors used with flashcubes from the beginning have had channels for seating the lamp in the back of a reflector with generally parabolic surfaces going out to each of the four corners, an opening at the bottom for the bulb to pass through, fitted areas at the top for the bulb to be located in, and flat wings out to each side. The gain of light by the use of such a flashcube reflector relative to light from a bare lamp alone in the center of the photographic field of the camera has been about 4.2.

However, as will be appreciated in the optical arts, further improvements in light gain with good control of light distribution are greatly to be desired.

SUMMARY OF THE INVENTION

An object of the present invention is to provide reflector-lamp modules or units for photoflash lamp devices such as a multilamp photoflash array having greatly increased efficiency of light output per unit volume as compared with the prior art. A further object is to provide such devices having good control over the direction of light output. A further object is to provide such devices in a form which can readily be adapted to use in conjunction with a multiplicity of such modules for a highly efficient multilamp photoflash device.

Briefly stated, the present invention in certain embodiments provides a photoflash device comprising the combination of a reflector and a tubular photoflash lamp wherein the reflector has a parabolic-type surface for essentially its entire effective reflecting area, with the lamp nested adjacent the innermost part of the curvature, and reflector essentially tangent to the lamp at that point. Also, the reflector, relative to its optical axis which is perpendicular to the above-mentioned tangent, has an angle of approximately 45° at a point adjacent or forward of about the centerline of the lamp. When the reflector has a vertically cylindrical parabolic-type portion, the optical axes of the reflector will lie in a plane. In one preferred embodiment, the 45° angle occurs adjacent approximately the centerline of the lamp. The reflector and lamp are preferably bisymmetrical about a plane longitudinally bisecting the lamp, and the reflector preferably has surfaces which are at least partially surfaces of revolution at each end, centered about the portion of each end of the lamp at the ends of the filling of filamentary combustible material therein.

BRIEF DESCRIPTION OF THE DRAWINGS

FIG. 1 is a geometrical diagram of a photoflash lamp and the construction lines for a reflector surface.

FIG. 2 is a plot of a preferred reflector surface of the invention schematically showing a lamp in place in the reflector.

FIG. 3 is a front elevational view of a preferred photoflash lamp-reflector module or unit of the invention.

FIG. 4 is a front view of a multiplicity of reflector units of the invention pressed into one sheet of material.

FIG. 5 shows a multilamp photoflash array having two such multiple reflectors of FIG. 4 nested in back to back relation with the lamps, a cover and a base.

FIG. 6 is a front view of a flashcube reflector of the prior art.

FIG. 7 is an illustration of a zonal lumen pattern for measuring the effectiveness for photographing and the uniformity of light control by a photoflash lamp-reflector unit.

DESCRIPTION OF THE PREFERRED EMBODIMENTS

The present invention provides a smooth reflector surface of curvature, the direction of which does not reverse, for use in conjunction with photoflash lamps which have a size which is quite large relative to the size available for the reflector. This is accomplished without nesting the lamp back into a tunnel formed by a discontinuous surface at the bottom of the reflector. And it is so done as to give an approximation of optimum light output and control from photoflash lamps in small reflectors. It is particularly useful for use with photoflash lamps which are quite small themselves.

Turning now to the drawings, FIG. 1 permits the analysis of the invention. The Y axis 2 bisects lamp 1, and the X axis 5 is tangent to lamp 1 at the intersection 9a of the X and Y axes. Using a fixed arbitrary ratio of maximum permissible reflector opening width to lamp diameter of 2.78:1, construction lines 3 and 4 have been laid out in FIG. 1 to give maximum permissible opening 6 which is tangent to the side of the lamp opposite the X axis at the point 9b where the axis passes through the front of the lamp 1, such construction lines forming 45° angles to said opening 6 and to Y axis 2. In accordance with the invention, a reflector surface is constructed tangent and adjacent to lamp 1 at the zero-point 9a of the X and Y axes and tangent to the 45° construction lines 3 and 4 at points 7 and 8 adjacent the midline or axial plane 7, 8 of the lamp 1 which is drawn perpendicular to the Y axis 2. If $d$ is taken as the diameter of the lamp and W as the width of the maximum permissible reflector opening, the reflector is to be constructed tangent to the lamp at the zero-point 9a of the X and Y axes and passing through the 45° lines 3 and 4 at $y=d/2$, which is at points 7 and 8.

Experiments have shown that best results are obtained in reflectors of the general type necessary for the present invention if they follow an equation essentially of a parabolic type which includes for purposes of the invention formulas in the family $$y=ax^n$$

where $1.5<n<3$. Although a true parabola has an equation $y=ax^2$, relatively minor variations from $x$ being taken to the second power are made in the equation with the resulting formula still being described as of essentially a parabolic type for purposes of the present invention.

The slope of this formula is given by
$$y'=dy/dx=anx^{n-1}.$$

The following conditions must be satisfied to meet the parameters discussed above:

when
$$x=\frac{W-d}{2}, y=\frac{d}{2}$$

and when
$$x=\frac{W-d}{2}, y'=4$$

Substituting these conditions in the above-mentioned general formula and deriving:

$$1=an\left(\frac{W-d}{2}\right)n-1$$

$$a=\frac{1}{n\left(\frac{W-d}{2}\right)n-1}$$

$$\frac{d}{2}=\frac{1}{n\left(\frac{W-d}{1}\right)n-1}\left(\frac{W-d}{2}\right)n$$

$$d = \frac{W-d}{n}$$

$$n = \frac{W-d}{d}$$

As a specific example, if the maximum permissible width of the reflector opening $W$ is set at 0.75 inch, and the diameter of the lamp is set at 0.27 inch, $n=1.778$ and $a=1.705$, both being approximate values. This establishes a preferred reflector contour for these sizes of maximum reflector opening and lamp diameter of $$y = 1.705 x^{1.778}$$
with $y \geq 0$ and $x \geq 0$.

This can be considered equivalent to approximately
$$y = 1.7 x^{1.8}.$$

Such a reflector is shown constructed in FIG. 2 as 10, 11, 12, 13. The reflector is tangent to lamp 1 at zero-point 9 of the X and Y axes and is tangent to the 45° lines 3 and 4 at points 7 and 8 adjacent to midpoint 1a of lamp 1. The inner circle 1b of the lamp is shown to illustrate approximately the source of light which is reflected by the reflector. Actually, due to a lens effect in the wall of the lamp, which usually includes both an inner glass envelope and an outer layer of plastic, and due to bunching of the usual filamentary combustible material, not shown in FIG. 2, the source of light 1b is normally somewhat but not much smaller than the inside diameter surface of lamp 1. Since various sizes can be used for the lamp diameter and the maximum reflector opening, the reflector is shown here on a scale of arbitrary units. Also, it will be appreciated that different proportions of lamp diameter and maximum permissible reflector opening can be used so that the above-mentioned specific formula is only one specific example of the invention, and other formulas will just as readily meet the general criteria of the invention in other embodiments of the invention.

The invention includes photoflash devices comprising the described reflectors, as well as such reflectors for use in such devices.

FIG. 3 illustrates a photoflash lamp 1 in place in reflector 14. A photoflash lamp of the type known in the art as an AG-1, or its modification which has been used for some time in the flashcube, can be used readily. Filamentary combustible material 17 is located within lamp 1 but somewhat removed from each end. The effective upper and lower extents of said filamentary combustible material 17 are shown by crossmarks at 18 and 19, respectively. In one preferred form of the invention, the reflector curvature is formed as a partial surface of revolution 15 adjacent the top of the lamp, revolved about point 18 at the top of the filamentary combustible material 17, and at 16 revolved about point 19 at the bottom of the filamentary combustible material 17. Point 18 is a distance A from the top of the reflector, and joint 19 is a distance B from the bottom of the reflector.

FIG. 4 illustrates four reflectors of the invention pressed into a common sheet of material 20 such as plastic which is aluminized after the pressing to give good reflector surfaces.

FIG. 5 shows two such sheets of material 21 and 22 with four reflector cavities each and with lamps showing in each of the cavities of reflector sheet 21. Said reflector sheets are nested back to back in a multiple photoflash lamp array and held together by cover 23 and base 24.

FIG. 6 illustrates a frontal view of the cross section of a reflector used in a flashcube of the prior art showing reflecting flats 30 and 31 along with tunnel 32 and recesses 33 and 34 for the top shoulder and the tip of the lamp. In this design of reflector, the only surfaces which were of a parabolic type and had very desirable configurations for maximum light control were the corners 35, 36, 37 and 38. Experiments have shown that reflecting flats 30 and 31 do not contribute as much to useful light output as do surfaces 35, 36, 37 and 38, per unit of projected area. In fact, when viewed from directly in front, applicant's reflector appears to be filled entirely with photoflash lamp images, while reflecting flats 30 and 31 of the prior art flashcube reflector do not reflect the lamp's images over their entire surfaces. This is simple evidence that the prior art flashcube reflector is not as efficient as it can be made to be. Actually, these reflecting flats 30 and 31 in the original flashcube permit folding the reflectors into a flashcube with their rims substantially adjoining one another, while approximately true parabolic surfaces 35, 36, 37 and 38 are used for the reflector according to a formula of $y=cx^2$. In contrast thereto, the present invention permits folding flashcube configurations from multiple reflectors, but does not use undesirable flat reflecting areas corresponding to area 30 and 31 of prior art flashcubes.

Reflectors of the present invention have parabolic-type surfaces for essentially their entire reflecting surfaces 60 and 61, rather than using substantial reflecting flats like 30 and 31 of the prior art flashcube reflector.

Also, flat areas 39, 40, 41 and 42 are totally wasted in the art flashcube reflectors. It will be seen that the present invention permits corresponding frontal flat areas of the preferred embodiment shown in FIG. 3 at 43, 44, 45 and 46 to be considerably smaller in proportion than these corresponding frontal flat areas 39, 40, 41 and 42 on the prior art flashcube reflector. Thus, it can be seen that the reflector of the present invention constitutes an advance in the art over that of the prior art flashcube.

The reflector of the present invention can be used either in a linear array as shown in FIG. 5, or folded into various geometries including a cube such as the flashcube, or used in other ways.

In the photographic arts, it is desirable that light from photoflash lamps be concentrated as greatly as possible within the picture-taking area, but have a minimum of variation across that picture-taking area. Comparisons of light output control can be made with reference to the zonal lumen chart of FIG. 7. Relative to center point 50, the chart has three solid adjoining angle bands 51 of 5°, 52 of 10°, and 53 of 5° in each of the sidewards and vertical directions along perpendicular axes 54 and 55. Compared to the gain in light output of prior art flashcubes at the center of the field of typically about 4.2, over that of the bare flashlamp alone, reflectors of the present invention have light gains which have been measured at typically about 5.0 for lamps and reflectors of the preferred types and sizes described herein. Also, these reflector-lamp modules of the invention have been measured at a ratio of brightness between the center region 51 and the outer region 53 of less than 2 to 1 such as about 1.3:1. The original prior art flashcube had a ratio of about 1.6:1. Reflector-lamp units of the invention have produced light typically of about 485 zonal lumen-seconds with lamps having a diameter of about 0.27 inch and a maximum length of about 1 inch in reflectors having a maximum permissible opening of 0.75 inch, an actual opening width of about 0.73 inch, a height of 1 inch and with the partial surfaces of revolution produced at the top from a center point 18 located a distance (A) of 0.290 inch down from the top of the reflector and produced at the bottom of the reflector with a center point 19 located a distance (B) of 0.340 inch up from the bottom.

Thus, it can be seen that reflector-lamp combinations of the present invention considerably outperform those of the prior art.

What I claim as new and desire to secure by Letters Patent of the United States is:

1. A photoflash device comprising the combination of a reflector and a photoflash lamp wherein:
   said photoflash lamp is a tubular lamp,
   said reflector has a parabolic-type surface for essentially its entire effective reflecting area with said photoflash lamp nested adjacent the innermost part of the curvature of said surface, with said curvature essentially tangent to said lamp at the innermost part of said curvature, and said reflector having an angle relative to its optical axis, in the direction of light projection, of approximately 45° at a point on that portion of the reflector comprising the region thereof adjacent the centerline of the lamp and the region forwardly thereof.

2. A photoflash device according to claim 1 in which the point at which the reflector has an angle of 45° relative to its optical axis is at about the centerline of said lamp.

3. A photoflash device according to claim 1 in which said lamp and said reflector are by symmetrical on the two sides of a plane bisecting the lamp longitudinally.

4. A photoflash device according to claim 1 in which said reflector has a curvature approximately according to the formula $$y=1.7x^{1.8}.$$

5. A photoflash device according to claim 1 in which said reflector terminates at its upper and lower ends in surfaces which are at least partially surfaces of revolution.

6. A photoflash device according to claim 5 in which said lamp contains a quantity of filamentary combustible material and in which the surfaces of revolution of the upper and lower ends of the reflector are centered on about the upper and lower ends, respectively, of said quantity of filamentary combustible material in said lamp.

7. A photoflash device according to claim 6 in which said reflector also has a vertically cylindrical parabolic-type central portion and said lamp is positioned in said reflector longitudinally of the said cylindrical central portion thereof.